United States Patent Office 3,244,523

Patented Apr. 5, 1966

3,244,523

MATERIAL FOR PHOTOGRAPHIC REPRODUCTION COMPRISING A CONDENSATION PRODUCT OF FORMALDEHYDE AND AN AMIDOGEN, A POLYACID RESIN AND A DIAZO COMPOSITION

Bert Growald and Robert M. Levy, Kalamazoo, Mich., assignors to Allied Paper Corporation, Kalamazoo, Mich., a corporation of Illinois No Drawing. Filed Jan. 21, 1963, Ser. No. 252,586
9 Claims. (Cl. 96—75)

The present invention relates to an improved photosensitive composition for preparing photosensitive vesicular print material.

In this process a photosensitive diazonium compound is incorporated in a plastic vehicle and spread as a transparent coating on a supporting base such as paper or plastic film. Upon exposure to actinic light through a design, the photosensitive material liberates a gas. The image is developed by softening the plastic vehicle, either with heat or by solvent action, to permit the gas nuclei to expand, thereby forming minute vesicles that scatter light which strikes those areas which were exposed through the design. This causes the exposed areas to appear white in reflected light while the nonexposed areas remain transparent. If the support is black paper, a sharp contrast is produced between the exposed and nonexposed areas which makes the process useful in preparing photocopies of printed material. The process is discussed in more detail in United States Patent No. 2,911,299.

The art is familiar with photographic vesicular images prepared from an ultraviolet light sensitive stratum made from hydrophilic materials such as gelatin, glue, polyvinyl alcohol and the like, and a photosensitive diazo compound which liberates nitrogen gas on photolysis. The art is also familiar with photographic vesicular images prepared from diazo compounds in hydrophobic thermoplastic vehicles such as polyvinyl chloride, polyvinyl acetate, copolymers of vinyl chloride and acetate, copolymers of vinylidene chloride and acrylonitrile, and the like, which are applied from organic solvent systems.

Both of these prior art systems have inherent disadvantages. In the prior hydrophilic colloid systems, while excellent images of good contrast can be obtained, development must be accomplished with steam or water which softens the hydrophilic vehicle. The vesicular image thus formed is extremely water sensitive and will gradually disappear on exposure to high humidity or liquid water. In the prior hydrophobic plastic systems the water sensitivity of the vesicular image is negligible and the print is simply developed after exposure to actinic light by gentle heating. While heat development is desirable from the standpoint of simplicity, this system suffers from the disadvantages of relatively poor image contrast and the finished print must be protected from heat.

It is, accordingly, an object of this invention to provide a vesicular print material having good contrast, being developable by heating and being relatively insensitive toward water, water vapor and heat after the image is developed.

Other objects will be apparent from the following description.

It has been found in accordance with the invention, that the above described drawbacks may be overcome, and superior vesicular print materials may be prepared by coating a suppor with an aqueous-alcohol solution of a polyacid resin and an amidogen-formaldehyde condensation product containing a diazonium compound, and drying. The two component vehicle has the advantages of both the hydrophilic and hydrophobic vehicle systems without the disadvantages of either. The polyacid resins and the amidogen-formaldehyde condensation products are well known and commercially available. The resulting coating shows excellent contrast, may be readily developed by heating after exposure to actinic light through a design and the resulting print has a very low sensitivity to degradation of image quality by moisture or heat. The proportions of polyacid resin to amidogen-formaldehyde condensation product should range from about 20:1 to about 1:1 in the dried coating.

The following illustrative but nonlimiting examples are given for a better understanding of the invention:

*Example I*

A sheet of black paper of ream weight 80 lb. (25 x 38–500) is uniformly coated with the following composition to give a layer weighing 10 lbs. per ream (25 x 38–500) when dried:

| | Parts by weight |
|---|---|
| Polyacrylic acid (25% water solution) | 60 |
| Water | 24 |
| p-Diazo dimethylaniline zinc chloride | 1.5 |

The above coated paper when exposed to ultraviolet light through a design and developed by heating to 230° F. for a few seconds produces an image of excellent contrast that could be reheated to 230 to 300° F. without appreciable loss in image quality. The image, however, showed poor resistance to liquid water and water vapor. This example does not illustrate the invention but is included to show the properties of a coating having only one of the two resins of the invention.

*Example II*

The base paper of Example I was coated with the following composition to give a pickup of approximately 10 lbs. per ream:

| | Parts by weight |
|---|---|
| Polyacrylic acid (25% water solution) | 60 |
| Water | 24 |
| Isopropyl alcohol | 10 |
| Melamine-formaldehyde (20% water solution) | 6 |
| p-Diazo dimethylaniline zinc chloride | 1.75 |

The above coated sheet when exposed and developed as described in Example I produced an image of excellent contrast, and heat stability, and was considerably improved in water resistance.

*Example III*

The base paper of Example I was coated with the following composition to give a pick up of approximately 10 lbs. per ream:

| | Parts by weight |
|---|---|
| Polyacrylic acid (25% water solution) | 60 |
| Isopropyl alcohol | 38 |
| Melamine-formaldehyde (80% water solution) | 14 |
| p-Diazo dimethylaniline zinc chloride | 3 |
| Water | 7 |

The above coated sheet when exposed and developed as described in Example I produced an image of excellent contrast and a very low order of sensitivity to heat and water or water vapor.

*Example IV*

The base paper of Example I was coated with the following composition to give a pick up of approximately 10 lbs. per ream:

| | Parts by weight |
|---|---|
| Poly (methyl vinyl ether/maleic anhydride) (25% water solution) | 60 |
| Isopropyl alcohol | 38 |
| Melamine-formaldehyde (80% water solution) | 14 |
| p-Diazo dimethylaniline zinc chloride | 3 |
| Water | 7 |

The above coated sheet when exposed and developed as described in Example I produced an image of excellent contrast and a very low order of sensitivity to heat and water or water vapor.

*Example V*

The base paper of Example I was coated with the following composition to give a pick up of approximately 10 lbs. per ream:

| | Parts by weight |
|---|---|
| Polyacrylic acid (25% water solution) | 60 |
| Isopropyl alcohol | 38 |
| Urea-formaldehyde (65% water solution) | 17 |
| p-Diazo dimethylaniline zinc chloride | 3 |
| Water | 4 |

The above coated sheet when exposed and developed as described in Example I produced an image of excellent contrast and a very low order of sensitivity to heat and water or water vapor.

Commercially available satisfactory polyacid resins are: Goodrite K702 (polyacrylic acid) produced by the Goodrich Chemical Co. and Gantrez AN (poly (methyl vinyl ether/maleic anhydride)) produced by the General Aniline and Film Corporation. The anhydride is referred to as an "acid" herein since it is hydrolyzed to the acid while in solution.

Commercially available satisfactory amidogen-formaldehyde condensation products are: Parez 613 (melamine-formaldehyde) and Paper Product 2452 (urea-formaldehyde) produced by the American Cyanamid Company and Resloom M–75 and M–80 (melamine-formaldehyde) produced by the Monsanto Chemical Company.

Satisfactory diazonium compounds are Sensitizer DM produced by the Fairmount Chemical Company and Edwal #8 produced by Edwal Laboratories.

The alcohol is present to give a homogeneous solution, prevent gellation of the amidogen resin, and aid in flow properties of the mixture.

Based on 100 parts by weight of dry polyacid resin in the coating from 10–80 parts of amidogen resin preferably are required to obtain the desired water resistance. Also, the amount of diazo can vary from 5 to 25 parts based on the polyacid resin.

The supporting base may be glass, cellophane, Mylar or other suitable material to give a negative print; or alternately, black paper, black coated paper, metal or any suitable contrasting opaque materials to give a positive print.

The photosensitive materials most suitable for use in the present invention are of the so-called diazo compounds which upon irradiation with actinic light liberate nitrogen gas. Among such sensitizing substances are:

p-Diazo dimethylaniline zinc chloride
p-Anilinobenzene diazonium sulfate
p(N-ethyl-N-hydroxyethylamino) benzenediazonium zinc chloride
p(N-ethyl-N-methylamino) benzenediazonium zinc chloride
4-diazo-3-oxynaphthalene sulfonic acid
4-NN-diethylamino-5-methylbenzenediazonium chloride The polyacid resins preferred are the water soluble thermoplastic resins typified by polyacrylic acid and poly (methyl vinyl ether/maleic anhydride).

The amidogen-formaldehyde condensation products preferably utilize water soluble alkylated methylol amidogens such as melamine, urea, thiourea, guanidine, dicyandiamide and the like.

Our invention utilizing the polyacid resins has a further advantage in that the acid exerts a high degree of heat stability on the diazo compound. For example, a paper coated with the polyacrylic acid diazo composition can be subjected to 250° F. prior to exposure and development with a negligible effect on the print quality. In prior art systems, especially those where hydrophobic plastic vehicles are used, the diazo would be practically destroyed under the same conditions.

The great improvement in water resistance through the use of amidogen-formaldehyde condensation compounds in combination with polyacid resins is not clearly understood. Possibly some type of cross-linking of the two polymers occurs during ultraviolet exposure that results in a vehicle which remains thermoplastic and practically impervious to nitrogen gas as well. The diazo compound having selective absorption in the ultraviolet in the range of 3000–5000 angstroms may also further aid in polymerization or cross-linking. Many photo initiated polymerizations, known to those skilled in the art, function in this manner.

It is well known that the amidogen-formaldehyde condensation products are thermosetting resins which require normally elevated temperature and time to cross-link and give water resistance. However, almost immediate water resistance is observed with the polyacid resin-amidogen-formaldehyde composition. While the above irradiation theory may be the cause of this favorable result, we do not wish to limit the invention to any particular theory.

We claim:

1. A coating composition for photographic reproduction systems comprising an aqueous solution of polyacrylic acid resin and melamine-formaldehyde condensation product containing a water soluble photosensitive diazo compound which liberates nitrogen gas upon irradiation, the ratio of said acid resin to said condensation product in said solution ranging from about 20:1 to about 1:1.

2. The coating composition of claim 1 in which the aqueous solvent consists of a mixture of water and alcohol.

3. A photosensitive vesicular material comprising a support sheet and a coating thereon comprising a homogeneous mixture of a photosensitive water soluble diazo compound, polyacrylic acid resin and an amidogen-formaldehyde condensation product, the ratio of said acid resin to said condensation product ranging from about 20:1 to about 1:1, said coating having been deposited from an aqueous solution of the coating ingredients.

4. The material of claim 3 in which said support sheet is a transparent plastic.

5. The material of claim 3 in which said support sheet is a black paper.

6. A photosensitive vesicular material comprising a support sheet having a homogeneous surface coating comprising a heat-softenable vehicle of 100 parts by weight of polyacrylic acid resin and from 10 to 80 parts by weight of a melamine-formaldehyde condensation product, and from 5 to 25 parts by weight of a photosensitive water soluble diazo compound, said coating ingredients having been deposited from an aqueous solution.

7. A photosensitive vesicular material comprising a sheet of dark colored paper having a heat softenable homogeneous coating thereon comprising 100 parts by weight of polyacrylic acid resin, from 10 to 80 parts by weight of a melamine-formaldehyde condensation product and from 5 to 25 parts by weight of a photosensitive water soluble diazo compound, said coating ingredients having been deposited from an aqueous solution.

8. The material of claim 7 in which said diazo compound is p-diazo dimethylaniline zinc chloride.

9. A coating composition for photographic reproduction systems comprising an aqueous solution of a polyacid resin taken from the group consisting of polyacrylic acid and poly (methyl vinyl ether/maleic anhydride) and a water-soluble alkylated methylol amidogen-formaldehyde condensation product, containing a photosensitive water soluble diazo compound, the ratio of said resin to said condensation product in said solution ranging from about 20:1 to about 1:1.

References Cited by the Examiner

UNITED STATES PATENTS

| | | | |
|---|---|---|---|
| 2,699,392 | 1/1955 | Herrick et al. | 96—49 X |
| 2,703,756 | 3/1955 | Herrick et al. | 96—49 |
| 2,908,572 | 10/1959 | Schoen | 96—49 |
| 2,996,381 | 8/1961 | Oster et al. | 96—49 |
| 3,032,414 | 5/1962 | James et al. | 96—91 |

FOREIGN PATENTS

| | | |
|---|---|---|
| 645,825 | 11/1950 | Great Britain. |
| 850,954 | 10/1960 | Great Britain. |

NORMAN G. TORCHIN, *Primary Examiner.*